(12) United States Patent
Shen

(10) Patent No.: US 11,109,250 B2
(45) Date of Patent: Aug. 31, 2021

(54) METHOD FOR DETECTING DOWNLINK CONTROL CHANNEL, METHOD FOR INDICATING DOWNLINK CONTROL CHANNEL, TERMINAL AND NETWORK SIDE DEVICE

(71) Applicant: VIVO MOBILE COMMUNICATION CO., LTD., Chang'an DongGuan (CN)

(72) Inventor: Xiaodong Shen, Chang'an DongGuan (CN)

(73) Assignee: VIVO MOBILE COMMUNICATION CO., LTD., Chang'an DongGuan (CN)

( * ) Notice: Subject to any disclaimer, the term of this patent is extended or adjusted under 35 U.S.C. 154(b) by 199 days.

(21) Appl. No.: 16/347,046

(22) PCT Filed: Oct. 31, 2017

(86) PCT No.: PCT/CN2017/108596
§ 371 (c)(1),
(2) Date: May 2, 2019

(87) PCT Pub. No.: WO2018/082543
PCT Pub. Date: May 11, 2018

(65) Prior Publication Data
US 2019/0281481 A1    Sep. 12, 2019

(30) Foreign Application Priority Data

Nov. 4, 2016    (CN) .......................... 201610966563.5

(51) Int. Cl.
*H04W 24/08*    (2009.01)
*H04W 72/04*    (2009.01)
(Continued)

(52) U.S. Cl.
CPC ....... *H04W 24/08* (2013.01); *H04W 52/0232* (2013.01); *H04W 72/042* (2013.01);
(Continued)

(58) Field of Classification Search
CPC ............. H04W 24/08; H04W 72/1278; H04W 52/0232; H04W 72/042; H04W 72/1273;
(Continued)

(56) References Cited

U.S. PATENT DOCUMENTS 9,686,798 B1* 6/2017 Zhao ................... H04W 72/042
2012/0163326 A1* 6/2012 Lee ................... H04W 72/0413
370/329
(Continued)

FOREIGN PATENT DOCUMENTS

CN    101001138 A    7/2007
CN    101841773 A    9/2010
(Continued)

OTHER PUBLICATIONS

PCT/CN2017/108596—International Search Report dated Jan. 8, 2018, 4 pages.
(Continued)

*Primary Examiner* — Will W Lin
(74) *Attorney, Agent, or Firm* — Getech Law LLC; Jun Ye

(57) ABSTRACT

A method for detecting a downlink control channel, a method for indicating a downlink control channel, a terminal and a network side device are provided. The method for detecting the downlink control channel includes: detecting, in a first downlink control channel, physical layer indication information sent by a network side device; determining, according to the physical layer indication information, resource location information of a second downlink control channel carrying control information; and detecting the control information in the second downlink control channel according to the resource location information.

15 Claims, 7 Drawing Sheets

(51) Int. Cl.
*H04W 72/12* (2009.01)
*H04W 52/02* (2009.01)
*H04W 88/02* (2009.01)
*H04L 5/00* (2006.01)
*H04L 1/00* (2006.01)

(52) U.S. Cl.
CPC ....... *H04W 72/1278* (2013.01); *H04L 1/0039* (2013.01); *H04L 5/0053* (2013.01); *H04W 72/1273* (2013.01); *H04W 88/02* (2013.01); *Y02D 30/70* (2020.08)

(58) Field of Classification Search
CPC ...... H04W 88/02; H04W 24/02; Y02D 30/70; H04L 5/0053; H04L 1/0039
See application file for complete search history.

(56) References Cited

U.S. PATENT DOCUMENTS

| | | | |
|---|---|---|---|
| 2013/0044699 | A1 | 2/2013 | Eriksson |
| 2013/0195065 | A1* | 8/2013 | Park .................. H04L 5/0055 370/329 |
| 2014/0177547 | A1 | 6/2014 | Guo et al. |
| 2014/0348089 | A1* | 11/2014 | Lv .................... H04L 5/0012 370/329 |
| 2015/0181574 | A1 | 6/2015 | Lee et al. |
| 2016/0128028 | A1* | 5/2016 | Mallik ................ H04L 1/0039 370/336 |
| 2018/0035311 | A1* | 2/2018 | Yang .................. H04W 16/14 |
| 2018/0167935 | A1* | 6/2018 | Yan .................... H04L 5/0094 |
| 2018/0263031 | A1* | 9/2018 | Cheng ................ H04L 1/0029 |

FOREIGN PATENT DOCUMENTS

| | | |
|---|---|---|
| CN | 102316522 A | 1/2012 |
| CN | 102858014 A | 1/2012 |
| CN | 103037510 A | 4/2012 |
| CN | 102724757 A | 10/2012 |
| CN | 103037511 A | 4/2013 |
| CN | 103457710 A | 12/2013 |
| CN | 104584460 A | 4/2015 |
| CN | 105722229 A | 6/2016 |
| CN | 106454901 A | 2/2017 |
| WO | 2010091608 A1 | 8/2010 |
| WO | 2010105461 A1 | 9/2010 |
| WO | 2015122629 A1 | 8/2015 |
| WO | 2017167271 A1 | 10/2017 |
| WO | 2018082543 A1 | 11/2018 |

OTHER PUBLICATIONS

PCT/CN2017108596, Extended European Search Report dated Sep. 13, 2019, 10 pages.

Huawei et al., "DCI Design for Short TTI", 3rd Generation Partnership Project (3GPP), Mobile Competence Centre, Apr. 11-15, 2016, 11 pages.

Interdigital Communications, "On SPDCCH Design", 3rd Generation Partnership Project (3GPP), Mobile Competence Centre, Oct. 2016, 5 pages.

Intel Corporation, "DCE Formats for Shorten TTI", 3rd Generation Partnership Project (3GPP), Mobile Competence Centre, Oct. 2016, 4 pages.

CN201610966563.5—First Office Action, dated Mar. 27, 2019, 10 pages. English Translation of Office Action, 10 pages.

* cited by examiner

METHOD FOR DETECTING DOWNLINK CONTROL CHANNEL, METHOD FOR INDICATING DOWNLINK CONTROL CHANNEL, TERMINAL AND NETWORK SIDE DEVICE

CROSS REFERENCE OF RELATED APPLICATION

The present application is the U.S. national phase of PCT Application PCT/CN2017/108596 filed on Oct. 31, 2017, which claims a priority of Chinese patent application No. 201610966563.5 filed on Nov. 4, 2016, which is incorporated herein by reference in its entirety.

TECHNICAL FIELD

The present disclosure relates to the field of optical technologies, and in particular to a method for detecting a downlink control channel, a method for indicating a downlink control channel, a terminal and a network side device.

BACKGROUND

A mobile communication system refers to a system in which an operator provides communication services for a user terminal (such as a mobile phone) by deploying a wireless access network device (such as a network side device) and a core network device (such as a Home Location Register).

Mobile communication has experienced the first generation, the second generation, the third generation, and the fourth generation. The first generation of mobile communication refers the cellular phone standard with the original analog, voice-only features, mainly using analog technology and Frequency Division Multiple Access (FDMA) access method. The second generation mobile communication introduced Digital technology, improved network capacity, improved voice quality and confidentiality, with Global System for Mobile Communication (GSM) and Code Division Multiple Access (CDMA IS-95) as the representative. The third generation of mobile communication mainly refers to CDMA2000, WCDMA, TD-SCDMA three technologies, all using code division multiple accessing as access technology. The fourth generation mobile communication system standards are relatively uniform internationally, which is Long Term Evolution/Long Term Evolution-Advanced (LTE/LTE-A) developed by the International Organization for Standardization (3GPP), whose downlink is based on Orthogonal Frequency Division Multiple Access (OFDMA) and uplink based on Single Carrier-Frequency Division Multiple Access (SC-FDMA) access method, which is based on flexibility bandwidth and adaptive modulation and coding scheme, the downlink peak rate reached 1 Gbps, and the uplink peak rate reached 500 Mbps.

In the conventional fourth-generation mobile communication system (LTE system), in the terminal ACTIVE state, the terminal continuously detects the control channel in the downlink transmission subframe to know whether or not the data related to the transmission is transmitted in the subframe. One advantage of this method is that the network side device schedules user data flexibly, and the data can be distributed at any time when it arrives at any time. However, the terminal needs to continuously detect the downlink control channel, and the requirements on the terminal are relatively high, and the power consumption is serious.

Therefore, some improvements have been made in the design of the later 4G LTE system, and DRX (Discontinuous Reception) technology has been introduced. In general, it is a discontinuous reception that allows the terminal to respond according to the configuration of the high-layer signaling, but this configuration is indicated by the high-layer signaling, and specifically includes: a period of the DRX and an offset of the DRX, etc., although the configuration can reduce the number of detections and power consumption of the terminal to some extent, but the configuration method is slow to implement and cannot adapt to rapid business changes, such as solving TCP slow start problems.

SUMMARY

The embodiments of the present disclosure provide a method for detecting a downlink control channel, a method for indicating a downlink control channel, a terminal and a network side device, so as to solve the problem that the configuring method for detecting the downlink control channel by the terminal in the LTE system cannot adapt to the fast service change and serious power consumption due to the frequently detecting of the downlink control channel.

In a first aspect, the present disclosure provides in some embodiments a method for detecting a downlink control channel, applied to a terminal side and including: detecting, in a first downlink control channel, physical layer indication information sent by a network side device; determining, according to the physical layer indication information, resource location information of a second downlink control channel carrying control information; and detecting the control information in the second downlink control channel according to the resource location information.

In a second aspect, the present disclosure further provides in some embodiments a method for indicating a downlink control channel, applied to a network side device and including: sending, through a first downlink control channel, physical layer indication information to a terminal, to indicate resource location information of the second downlink control channel carrying control information to the terminal; sending the control information through the second downlink control channel corresponding to the physical layer indication information.

In a third aspect, the present disclosure further provides in some embodiments a terminal, including: a first detecting module, configured to detect, in a first downlink control channel, physical layer indication information sent by a network side device; a first processing module, configured to determine, according to the physical layer indication information, resource location information of a second downlink control channel carrying control information; and a second detecting module, configured to detect the control information in the second downlink control channel according to the resource location information.

In a fourth aspect, the present disclosure further provides in some embodiments a network side device, including: a first sending module, configured to send, through a first downlink control channel, physical layer indication information to a terminal, to indicate resource location information of the second downlink control channel carrying control information to the terminal; a second sending module is configured to send the control information through the second downlink control channel corresponding to the physical layer indication information.

In a fifth aspect, the present disclosure further provides in some embodiments a user terminal, including: a memory, a processor and a computer program stored in the memory and operable on the processor, where the processor executes the computer program to perform the method for detecting a downlink control channel in the first aspect.

In a sixth aspect, the present disclosure further provides in some embodiments a network side device, including: a memory, a processor and a computer program stored in the memory and operable on the processor, where the processor executes the computer program to perform the method for indicating a downlink control channel in the second aspect.

In a seventh aspect, the present disclosure further provides in some embodiments a computer readable storage medium, where a computer program is stored in the computer readable storage medium, the computer program is executed by a processor to perform the method for detecting a downlink control channel in the first aspect.

In an eighth aspect, the present disclosure further provides in some embodiments a computer readable storage medium, where a computer program is stored in the computer readable storage medium, the computer program is executed by a processor to perform the method for indicating a downlink control channel in the second aspect.

According to the embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal. In addition, since the network side device uses the physical layer indication information to indicate the configuration signaling of the discontinuous transmission originally performed in L2/L3, thereby reducing the detection complexity of the terminal. In addition, the network side device may further determine the scheduling quantity of the second downlink control channels according to the transmission condition of the TCP data packet, so as to solve the slow start problem of the TCP service.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The embodiment of the present disclosure will be described hereinafter in conjunction with the drawings. However, it should be appreciated that the following embodiments are f not be used to limit the scope of the present disclosure. Instead, the following embodiments are used to make the present disclosure better understood and convey the scope of the present disclosure completely to those skilled in the art.

Figure 1:
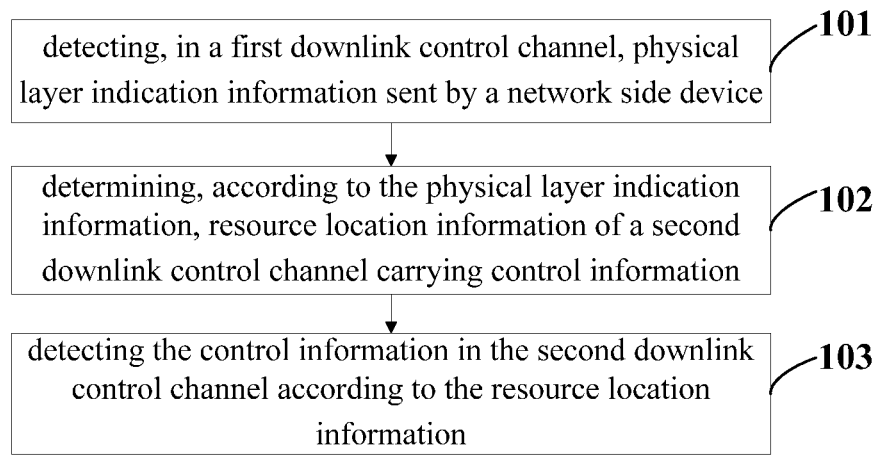
FIG. 1 is a flow chart of a method for detecting a downlink control channel in the first embodiment of the present disclosure.

In some embodiments of the present disclosure, as shown in FIG. 1, a method for detecting a downlink control channel is provided, including the following step:

Step 101: detecting, in a first downlink control channel, physical layer indication information sent by a network side device.

The first downlink control channel may be a physical downlink control channel or a physical downlink shared channel. The physical layer indication information refers to the physical layer control signaling, which is used to indicate the resource location information of the second downlink control channel carrying the control information, and this may reduce the detection complexity of the terminal to a certain extent and save the processing resources of the terminal by way of using the physical layer control signaling.

Step 102: determining, according to the physical layer indication information, resource location information of a second downlink control channel carrying control information.

When the terminal detects the first downlink control channel and obtains the physical layer indication information, the terminal may determine, by analyzing the physical layer indication information, the resource location information of the second downlink control channel that is scheduled by the network side device for the control information sent by the terminal.

Step 103: detecting the control information in the second downlink control channel according to the resource location information.

By analyzing the received physical layer indication information, the terminal may obtain the corresponding resource location information, and detect the second downlink control channel corresponding to the resource location information, so that only the downlink control channel carrying the control information is detected, instead of detecting all downlink control channels, thereby reducing the times of detecting the terminal and reducing the power consumption of the terminal.

According to the terminal in some embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal. In addition, since the network side device uses the physical layer indication information to indicate the configuration signaling of the discontinuous transmission originally performed in L2/L3, thereby reducing the detection complexity of the terminal.

In some embodiments of the present disclosure, the above embodiment briefly describes the method for detecting a downlink control channel of the present disclosure. The following embodiments will be further described in conjunction with the accompanying drawings and specific application scenarios.

Figure 2:
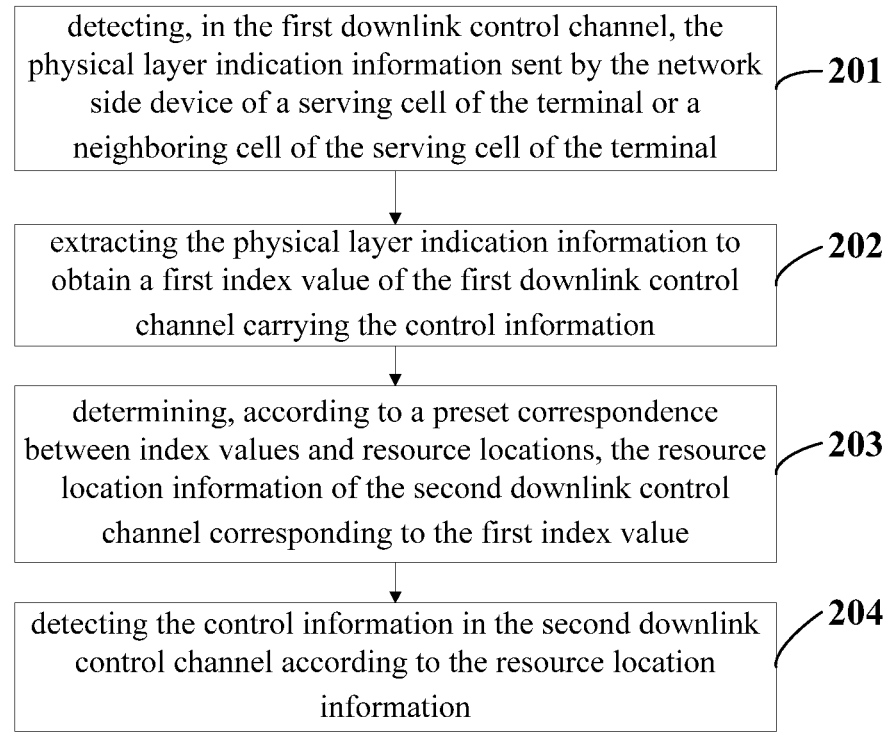
FIG. 2 is a flow chart of a method for detecting a downlink control channel in the first embodiment of the present disclosure.

As shown in FIG. 2, the method for detecting a downlink control channel in some embodiments of the present disclosure includes the following steps:

Step 201: detecting, in the first downlink control channel, the physical layer indication information sent by the network side device of a serving cell of the terminal or a neighboring cell of the serving cell of the terminal.

This means that different cells, sectors, or groups may have their own physical layer indication information, and may also share the same physical layer indication information. The shared scenario is generally applicable to the sharing of neighboring cells. For example, the terminal detects the first downlink control channel, and obtains the physical layer indication information that is sent by the network side device to which the serving cell belongs, and the physical layer indication information is used to indicate the resource location information of the second downlink control channel of the serving cell that carries the control information; or, the terminal detects the first downlink control channel, and obtains the physical layer indication information sent by the network side device to which the neighboring cell belongs, and the neighboring cell shares the same physical indication information with the serving cell. Then, according to the received physical layer indication information sent by the network side device to which the serving cell belongs, it is also able to obtain the resource location information of the second downlink control channel carrying the control information of the serving cell.

Further, Step 201 may further include: acquiring a high-layer control signaling sent by the network side device; determining, according to the high-layer control signaling, a transmission period and an offset of the physical layer indication information; determining, according to the transmission period and the offset, a subframe number of the downlink control channel carrying the physical layer indication information; and detecting the physical layer indication information sent by the network side device, in the downlink control channel corresponding to the subframe number.

Figure 3:
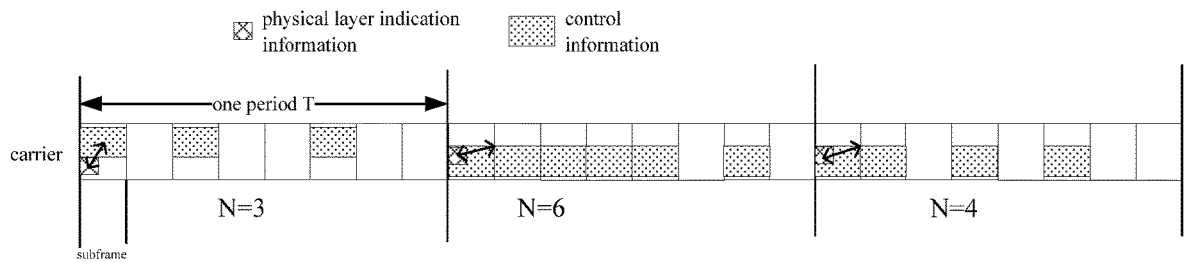
FIG. 3 is a schematic view of a self-carrier scheduling control channel in some embodiments of the present disclosure.
Figure 4:
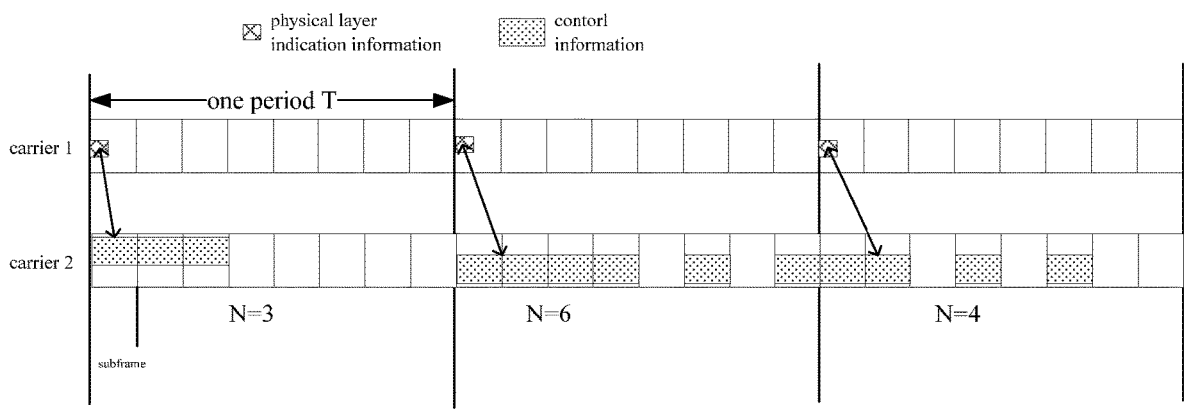
FIG. 4 is a schematic view of a self-carrier scheduling control channel in some embodiments of the present disclosure.

Specifically, the determining, according to the transmission period and the offset, the subframe number of the downlink control channel carrying the physical layer indication information includes: according to a formula idx mod T=offset, determining the subframe number of the downlink control channel carrying the physical layer indication information, where idx is the subframe number of the downlink control channel carrying the physical layer indication information, T is a transmission period of the indication information, and offset is the offset to send the indication information. That is, T and offset are notified through the high-layer signaling, and mod is a remainder taking operation, that is, the subframe number idx=N*T+offset, only the subframe whose idx satisfies the above relationship may carry the downlink control channel. As shown in FIG. 3 and FIG. 4, by parsing the high-layer control signaling, the terminal learns that the transmission period of the physical layer indication information is 8 subframes, and the offset is 0, that is, the terminal detects whether there is physical layer indication information on the subframe with the number of integer multiple of 8 and subducting 1 (the number of subframe starts at 0). As shown in FIG. 3, the physical layer indication information detected in the first period indicates that there are three second downlink control channels carrying the control information (N=3), the specific resource location is indicated by the arrow. The physical layer indication information detected in the second period indicates that there are six second downlink control channels carrying the control information (N=6), the specific resource location is indicated by the arrow. The physical layer indication information detected in the third period indicates that there are four second downlink control channels carrying the control information (N=4), the specific resource location is indicated by the arrow, the detection and indication of FIG. 4 is the same as that of FIG. 3, and therefore it will not be described again.

Subsequent to the detecting the physical layer indication information sent by the network side device in the downlink control channel corresponding to the subframe number, the method further includes: if the physical layer indication information is not detected, feeding back a non-response message (NACK message) to the network side device, or determining that the physical layer indication information is not carried in the downlink control channel corresponding to the subframe number. That is, the terminal has two processing modes for detecting the physical layer indication information, one is to send an acknowledgement, and the other is to send a non-acknowledgment.

The sending acknowledgement mode means that the terminal first performs periodic detection according to the high-layer signaling configuration. For example, the terminal learns that transmission period of the physical layer indication information is T and the offset is offset, according to the high-layer signaling. The terminal detects physical indication layer information in the subframe with the subframe number satisfying the formula idx mod T=offset. If the terminal does not detect the physical layer indication information in the subframe corresponding to the subframe number, the terminal sends a NACK to the network side device to notify the error information.

The sending non-acknowledgment mode means that the terminal first performs periodic detection according to the high-layer signaling configuration. For example, the terminal learns that transmission period of the physical layer indication information is T and the offset is offset, according to the high-layer signaling. The terminal detects physical indication layer information in the subframe with the subframe number satisfying the formula idx mod T=offset. If the terminal does not detect the physical layer indication information in the subframe corresponding to the subframe number, the terminal considers that there is no control message needed to be detected in the subframe (the NACK report is not required to be sent to the network).

It should be noted that, the specific implementation of the detecting through the first downlink control channel to obtain the physical layer indication may be also realized by blind detection or a priori physicality, and the specific implementation manner is not limited. In addition, it should be noted that all the manners applicable to the implementation of Step 201 are also applicable to the implementation of Step 101 in the first embodiment.

Step 202: extracting the physical layer indication information to obtain a first index value of the first downlink control channel carrying the control information.

The physical layer indication information can be carried to a predefined special field for indication, and the different values of the special field indicate different resource locations, and the index value may be a value of a special field, or may be taken with a special field. A code with a certain mapping relationship.

Step 203: determining, according to a preset correspondence between index values and resource locations, the resource location information of the second downlink control channel corresponding to the first index value.

The resource location information of the second downlink control channel includes at least one of: a downlink subframe number, a frequency domain location, a spatial domain location and a carrier number of the second downlink control channel. Further, in order to shorten the number of bytes occupied by the index value, the possible values of the special fields may be compiled into an index table according to a certain combination manner. As shown in the following table, the index table shows a corresponding relationship between index values and the possible values of the special field indicating the resource location. Different values of the special field correspond to different resource locations, then only the index value of the physical layer indication information needs to be parsed, and the resource location of the corresponding downlink control channel may be obtained by looking up the table.

| index value | subframe number xx | frequency domain location yy | spatial domain location zz | carrier number ww |
|---|---|---|---|---|
| 001 | xx1 | yy1 | zz1 | ww1 |
| 002 | xx2 | yy2 | zz2 | ww2 |
| ... | xx... | yy... | zz... | ww... |
| 016 | xx16 | yy16 | zz16 | ww16 | where the index value has a certain mapping relationship with the value of the special field, the field xx is the indication field of the subframe number, the field yy is an indication field of the frequency domain location, the field zz is an indication field of the airspace location, and the field ww is an indication field of the carrier number, and the value information of the indication field corresponding to the first index value can be found by searching the table. Then the specific resource location may be obtained according to the specific value of the indication field.

Step 204: detecting the control information in the second downlink control channel according to the resource location information.

The control information includes resource location information occupied by a transmission channel carrying service data, such as time-frequency domain allocation, MCS, and the like. In order to further simplify the detection complexity of the terminal, the control information sent by the network side device may also be transmitted through the physical layer signaling, that is, the control information is specifically the physical layer control information.

Further, the physical layer indication information may indicate control information transmitted in the same carrier, and may also indicate control information transmitted in a different carrier from the physical layer indication information. That is, the physical layer indication information and control information sent by the network side device may be transmitted in a single carrier (as shown in FIG. 3), or can be transmitted in multiple carriers (as shown in FIG. 4, the indication information is transmitted in the carrier 1, and the control information is transmitted in carrier 2).

Figure 5:
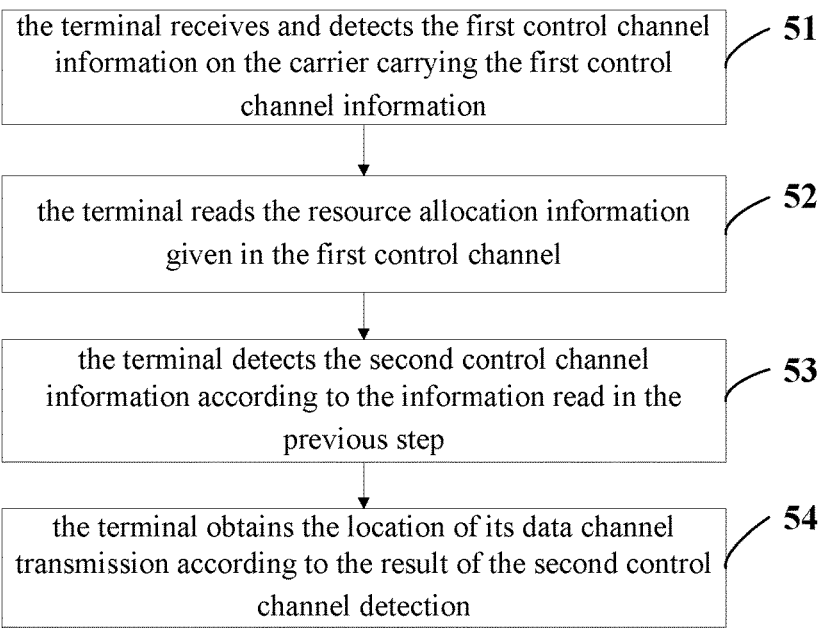
FIG. 5 is a flowchart of performing a downlink control channel detection by a terminal in some embodiments of the present disclosure.

Thus, as shown in FIG. 5, the step of the terminal detecting the control information by detecting the control signaling twice includes the following steps.

Step 51: the terminal receives and detects the first control channel information on the carrier carrying the first control channel information. The detection method may be configured by the terminal according to terminal blind detection or based on a priori physical layer or higher layer signaling.

Step 52: the terminal reads the resource allocation information given in the first control channel. For example, a time domain appearance position, a frequency domain appearance position, beam information or a carrier number of the second control channel, or the like.

Step 53: the terminal detects the second control channel information according to the information read in the previous step. Other valid information may be combined during the detecting process.

Step 54: the terminal obtains the location of its data channel transmission according to the result of the second control channel detection. Such as time position, or frequency domain location, or Modulation and Coding Scheme (MCS), or HARQ (Hybrid Automatic Repeat reQuest) process or the like. In this way, the terminal obtains the downlink control channel corresponding to the physical layer indication information through the blind detection, a priori physical layer, or parsing the high-layer control signaling, and detects that the downlink control channel to obtain the physical layer indication information. According to the physical layer indication information, the second downlink control channel corresponding to the resource location information is detected to obtain corresponding control information, thereby reducing the times of detecting of the terminal and reducing the power consumption of the terminal.

According to the terminal in some embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal. In addition, since the network side device uses the physical layer indication information to indicate the configuration signaling of the discontinuous transmission originally performed in L2/L3, thereby reducing the detection complexity of the terminal.

Figure 6:
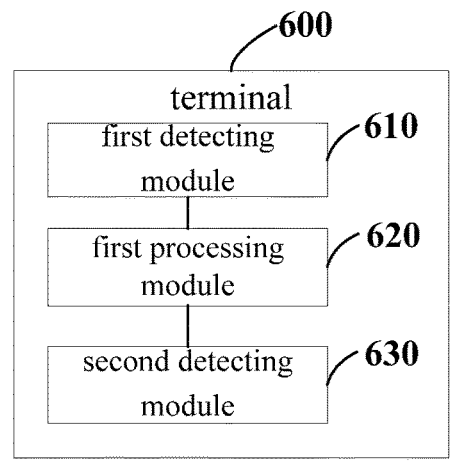
FIG. 6 is a first schematic view of a terminal in some embodiments of the present disclosure.
Figure 7:
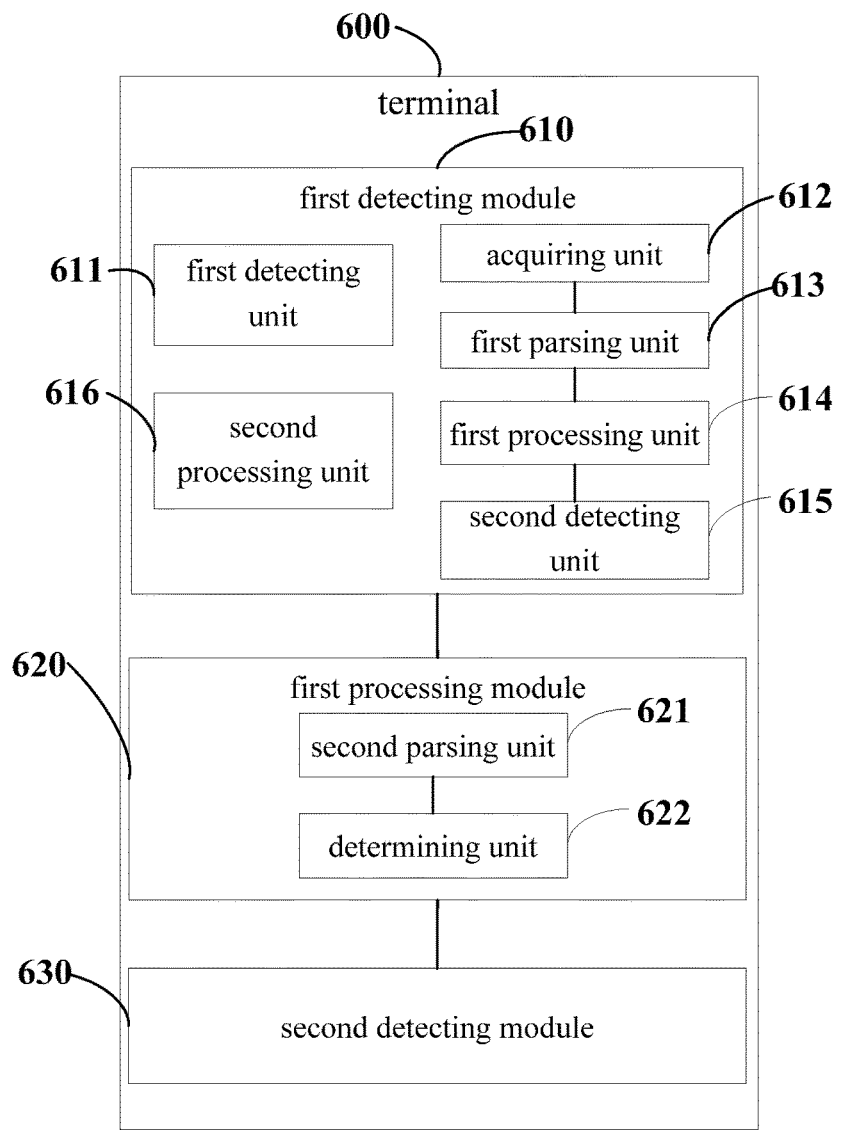
FIG. 7 is a second schematic view of a terminal in some embodiments of the present disclosure.

In some embodiments, the foregoing two embodiments respectively describe the detection method of the downlink control channel in different scenarios, and the terminal corresponding thereto is further described in conjunction with FIG. 6 and FIG. 7.

As shown in FIG. 6, the terminal 600 in some embodiments of the present disclosure may implement the method of detecting, in a first downlink control channel, physical layer indication information sent by a network side device; determining, according to the physical layer indication information, resource location information of a second downlink control channel carrying control information; and detecting the control information in the second downlink control channel according to the resource location information and achieve the same effect. Specifically the terminal 600 includes: a first detecting module 610, configured to detect, in a first downlink control channel, physical layer indication information sent by a network side device; a first processing module 620, configured to determine, according to the physical layer indication information, resource location information of a second downlink control channel carrying control information; and a second detecting module 630, configured to detect the control information in the second downlink control channel according to the resource location information.

As shown in FIG. 7, the first detecting module 610 includes: a first detecting unit 611, configured to detect, in the first downlink control channel, the physical layer indication information sent by the network side device of a serving cell of the terminal or a neighboring cell of the serving cell of the terminal.

The first detecting module 610 further includes: an acquiring unit 612, configured to acquire a high-layer control signaling sent by the network side device; a first parsing unit 613, configured to determine, according to the high-layer control signaling, a transmission period and an offset of the physical layer indication information; a first processing unit 614, configured to determine, according to the transmission period and the offset, a subframe number of the downlink control channel carrying the physical layer indication information; and a second detecting unit 615, configured to detect the physical layer indication information sent by the network side device, in the downlink control channel corresponding to the subframe number.

The first processing unit 614 is configured to: according to a formula idx mod T=offset, determine the subframe number of the downlink control channel carrying the physical layer indication information, where idx is the subframe number of the downlink control channel carrying the physical layer indication information, T is a transmission period of the indication information, and offset is the offset to send the indication information.

The first detecting module 610 further includes: a second processing unit 616, configured to, if the physical layer indication information is not detected, feed back a non-response message to the network side device, or determine that the physical layer indication information is not carried in the downlink control channel corresponding to the subframe number.

The resource location information of the second downlink control channel includes at least one of: a downlink subframe number, a frequency domain location, a spatial domain location and a carrier number of the second downlink control channel.

The first processing module 620 includes: a second parsing unit 621, configured to extract the physical layer indication information to obtain a first index value of the first downlink control channel carrying the control information; a determining unit 622, configured to determine, according to a preset correspondence between index values and resource locations, the resource location information of the second downlink control channel corresponding to the first index value.

The control information includes the resource location information occupied by a transmission channel carrying service data.

It should be noted that the terminal in the embodiment of the present disclosure is a terminal corresponding to the detection method of the downlink control channel, and the implementation manner of the foregoing method and the technical effects of the implementation are applicable to the embodiment of the terminal. According to the embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal.

In some embodiments, the foregoing embodiments respectively describe the detection method and the terminal of the downlink control channel of the present disclosure on the terminal side, and the following embodiment will refer to the figure and the specific application scenario to describe the method for indicating a downlink control channel applied to a network side device.

Figure 8:
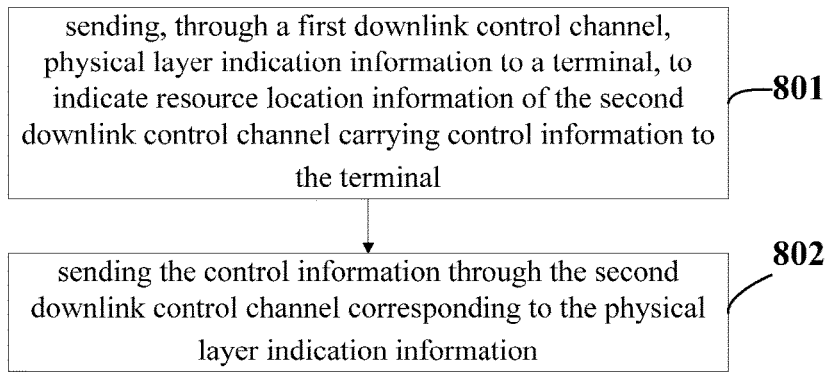
FIG. 8 is a flow chart of a method for indicating a downlink control channel in some embodiments of the present disclosure.

As shown in FIG. 8, the method for indicating a downlink control channel according to an embodiment of the present disclosure specifically includes the following steps.

Step 801: sending, through a first downlink control channel, physical layer indication information to a terminal, to indicate resource location information of the second downlink control channel carrying control information to the terminal.

The first downlink control channel may be a physical downlink control channel or a physical downlink shared channel. The physical layer indication information refers to physical layer control signaling, and is used to indicate resource location information of a second downlink control channel carrying control information. The network side device uses physical layer control signaling to notify the terminal, thereby reducing the detection complexity of the terminal and saving the processing resources of the terminal to a certain extent.

Step 802: sending the control information through the second downlink control channel corresponding to the physical layer indication information.

The network side device sends the corresponding control information to the terminal through the second downlink control channel scheduled for the terminal, and the terminal obtains the corresponding resource location information by parsing the received physical layer indication information, and detects the second downlink control channel corresponding to the resource location information to obtain corresponding control information, so that only the downlink control channel carrying the control information is detected, instead of detecting all downlink control channels, thereby reducing the times of detecting of the terminal and reducing power consumption of the terminal.

According to the network side device in some embodiments of the present disclosure, the network side device sends a physical layer indication information to the terminal to inform the terminal of the resource location information of the second downlink control channel carrying the downlink control information, so that the terminal only detects the downlink control channel carrying the control information, instead of detecting all downlink control channels, thereby reducing the times of detecting of the terminal and reducing the power consumption of the terminal. In addition, the network side device uses the physical layer signaling manner to indicate, thereby reducing the detection complexity of the terminal to the downlink control channel.

In some embodiments, the foregoing embodiment briefly describes a method for indicating a downlink control channel, which will be further described below in conjunction with the accompanying drawings and specific application scenarios.

Figure 9:
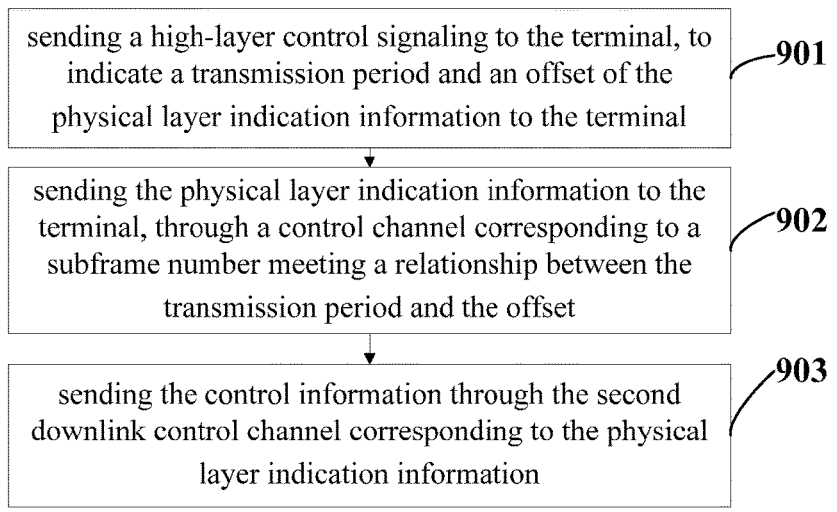
FIG. 9 is a flow chart of a method for indicating a downlink control channel in some embodiments of the present disclosure.

As shown in FIG. 9, the method for indicating a downlink control channel in some embodiments of the present disclosure includes the following steps:

Step 901: sending a high-layer control signaling to the terminal, to indicate a transmission period and an offset of the physical layer indication information to the terminal.

Step 902: sending the physical layer indication information to the terminal, through a control channel corresponding to a subframe number meeting a relationship between the transmission period and the offset.

The subframe number idx can be obtained by the following relation idx mod T=offset.

The idx is the subframe number of the downlink control channel carrying the physical layer indication information, T is a transmission period of the indication information, and offset is the offset to send the indication information. That is, T and offset are notified through the high-layer signaling, and mod is a remainder taking operation, that is, the subframe number idx=N*T+offset, only the subframe whose idx satisfies the above relationship may carry the downlink control channel.

Figure 10:
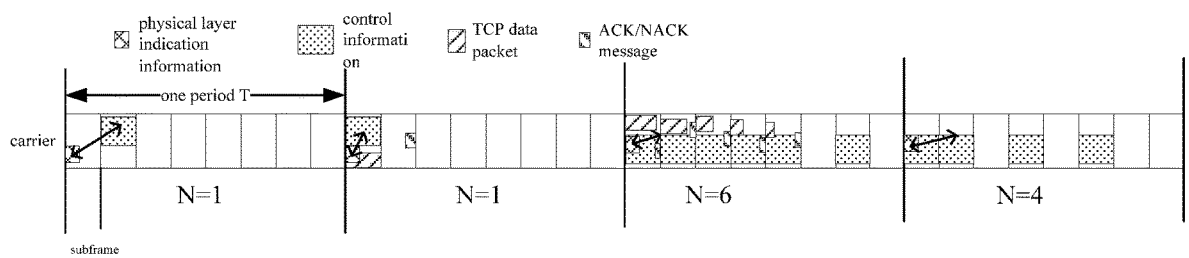
FIG. 10 is a schematic view showing an indication of TCP service initiation in some embodiments of the present disclosure.

Further, in order to solve the problem of slow start of the Transmission Control Protocol (TCP) service, the network side device can dynamically adjust the quantity of the second downlink control channels according to the feedback information of the terminal, which can be implemented by referring to the following manner. when detecting the transmission or arrival of the TCP packet, the network side device determines the quantity of the second downlink control channels carrying the control information according to the transmission condition of the TCP packet; determines the physical layer indication sent to the terminal according to the quantity of the second downlink control channels. The physical layer indication information includes the quantity of the second downlink control channels and the resource location information that is occupied. As shown in FIG. 10, when there is seldom service or no service in a certain terminal, the network side device is configured to schedule the downlink control channel (only one downlink subframe is scheduled in the first period in the figure, N=1) in only one or several downlink subframes in a period of each T milliseconds (8 subframes in the figure). When the terminal detects that a TCP packet arrives in a certain period, the terminal feeds back it to the network side device, so that the network side device may configure more downlink subframes in the next period to schedule the downlink control channel (6 downlink subframes are scheduled in the second period, N=6) to meet the fast packet interaction of the terminal in the TCP service startup phase, so as to solve the slow start of TCP service. The network side device can dynamically adjust the quantity of scheduled downlink control channels according to the transmission condition of the TCP data packet and the size of the TCP data packet.

After the TCP service of the terminal is started, the network side device configures the number of downlink subframes for scheduling the downlink control channel according to the amount of traffic of the terminal. (4 downlink subframes are scheduled in the third period in the figure, N=4). In this way, the quantity of the second downlink control channels is dynamically adjusted according to the feedback information of the terminal, and the quantity of the downlink subframes is increased when the TCP service is started, thereby realizing the fast data packet interaction in the TCP service startup phase and solving the slow start problem of the terminal TCP service.

Step 903: sending the control information through the second downlink control channel corresponding to the physical layer indication information.

The network side device sends the corresponding control information to the terminal through the second downlink control channel scheduled for the terminal, and the terminal obtains the corresponding resource location information by parsing the received physical layer indication information, and detects the second downlink control channel corresponding to the resource location information to obtain corresponding control information, so that only the downlink control channel carrying the control information is detected, instead of detecting all downlink control channels, thereby reducing the times of detecting of the terminal and reducing power consumption of the terminal.

According to the network side device in some embodiments of the present disclosure, the network side device sends a physical layer indication information to the terminal to inform the terminal of the resource location information of the second downlink control channel carrying the downlink control information, so that the terminal only detects the downlink control channel carrying the control information, instead of detecting all downlink control channels, thereby reducing the times of detecting of the terminal and reducing the power consumption of the terminal. In addition, the network side device uses the physical layer signaling to indicate, thereby reducing the detection complexity of the terminal to the downlink control channel. In addition, the network side device may further determine the scheduling quantity of the second downlink control channels according to the transmission condition of the TCP data packet, so as to solve the slow start problem of the TCP service.

Figure 11:
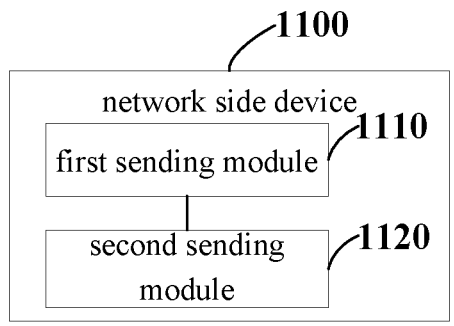
FIG. 11 is a first schematic view of a network side device in some embodiments of the present disclosure.
Figure 12:
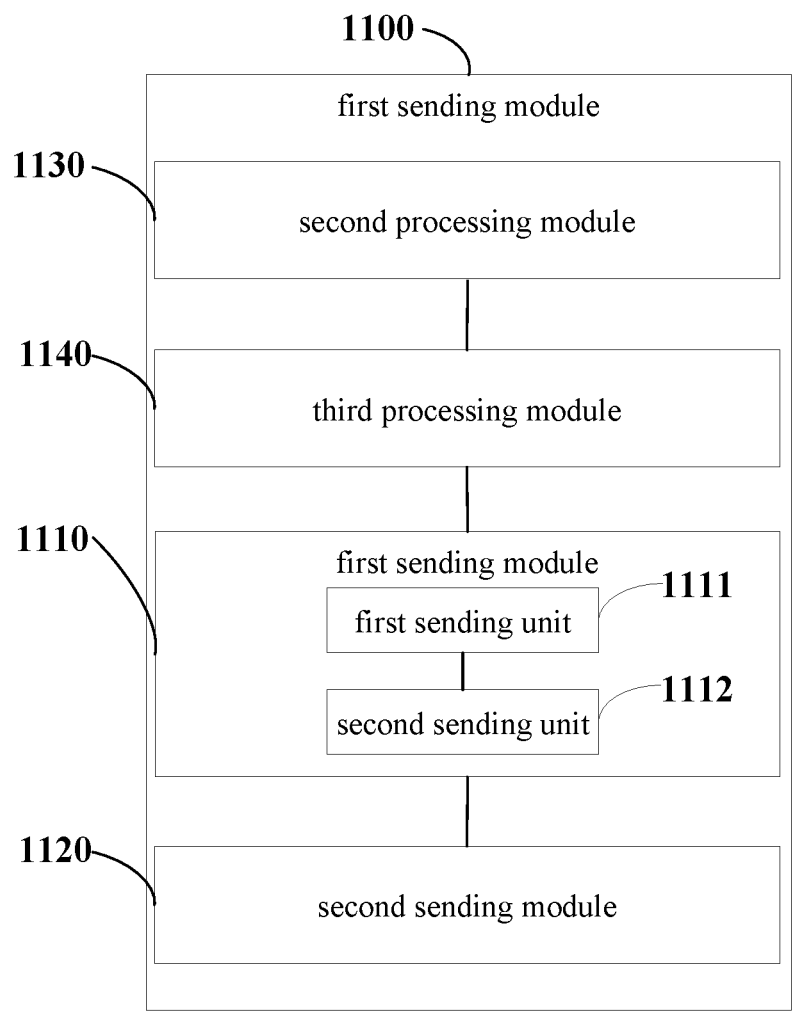
FIG. 12 is a second schematic view of a network side device in some embodiments of the present disclosure.

In some embodiments, the foregoing embodiment separately describes the indication method of the downlink control channel of the network side device, and the following embodiment further introduces the corresponding network side device according to FIG. 11 and FIG. 12.

As shown in FIG. 11, the network side device 1100 of the embodiment of the present disclosure can implement the method of sending, through a first downlink control channel, physical layer indication information to a terminal, to indicate resource location information of the second downlink control channel carrying control information to the terminal; sending the control information through the second downlink control channel corresponding to the physical layer indication information in the fourth embodiment and the fifth embodiment and achieves the same effect, specifically includes the following functional modules: a first sending module 1110, configured to send, through a first downlink control channel, physical layer indication information to a terminal, to indicate resource location information of the second downlink control channel carrying control information to the terminal; a second sending module 1120, configured to send the control information through the second downlink control channel corresponding to the physical layer indication information.

As shown in FIG. 12, the first sending module includes: a first sending unit 1111, configured to send a high-layer control signaling to the terminal, to indicate a transmission period and an offset of the physical layer indication information to the terminal; a second sending unit 1112, configured to send the physical layer indication information to the terminal, through a control channel corresponding to a subframe number meeting a relationship between the transmission period and the offset.

The network side device 1100 further includes: a second processing module 1130, configured to, if a TCP data packet is sent or arrived, determine, according to a transmission condition of the TCP data packet, a quantity of the second downlink control channels carrying the control information; a third processing module 1140, configured to determine the physical layer indication information sent to the terminal, according to the quantity of the second downlink control channels.

It should be noted that the network side device of the embodiment of the present disclosure is a network side device corresponding to the indication method of the downlink control channel, and the implementation manner of the foregoing method and the technical effects of the implementation are applicable to the embodiment of the network side device. According to the network side device in some embodiments of the present disclosure, the network side device sends a physical layer indication information to the terminal to inform the terminal of the resource location information of the second downlink control channel carrying the downlink control information, so that the terminal only detects the downlink control channel carrying the control information, instead of detecting all downlink control channels, thereby reducing the times of detecting of the terminal and reducing the power consumption of the terminal. In addition, the network side device uses the physical layer signaling to indicate, thereby reducing the detection complexity of the terminal to the downlink control channel. In addition, the network side device may further determine the scheduling quantity of the second downlink control channels according to the transmission condition of the TCP data packet, so as to solve the slow start problem of the TCP service.

Figure 13:
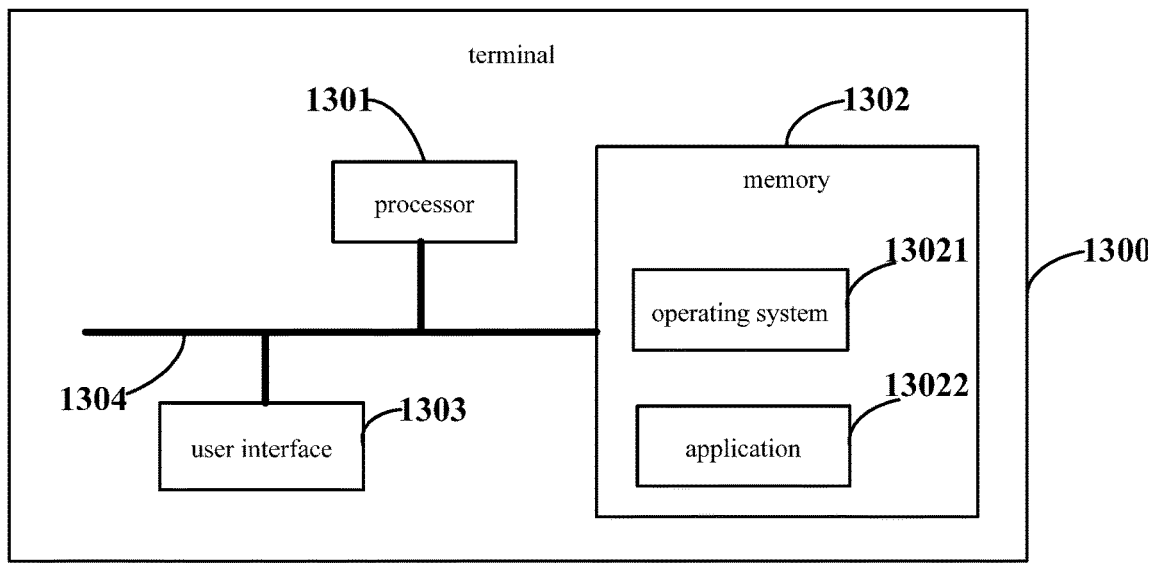
FIG. 13 is a block diagram of a terminal in some embodiments of the present disclosure.

In some embodiments, FIG. 13 is a block diagram of a terminal 1300 of another embodiment of the present disclosure. The terminal shown in FIG. 13 includes at least one processor 1301, a memory 1302, and a user interface 1303. The various components in terminal 1300 are coupled together by a bus system 1304. It will be appreciated that the bus system 1304 is used to implement connection communication between these components. The bus system 1304 includes a power bus, a control bus, and a status signal bus in addition to the data bus. However, for clarity of description, various buses are labeled as bus system 1304 in FIG. 13.

The user interface 1303 may include a display or a pointing device (e.g., a touchpad or a touch screen, etc.).

It is to be understood that the memory 1302 in the embodiments of the present disclosure may be a volatile memory or a non-volatile memory, or may include both volatile and non-volatile memory. The non-volatile memory may be a read-only memory (ROM), a programmable read only memory (PROM), an erasable programmable read only memory (Erasable PROM, EPROM), or an electric Erase programmable read only memory (EEPROM) or flash memory. The volatile memory can be a Random Access Memory (RAM) that acts as an external cache. By way of example and not limitation, many forms of RAM are available, such as static random access memory (SRAM), dynamic random access memory (DRAM), synchronous dynamic random access memory (Synchronous DRAM). SDRAM), Double Data Rate Synchronous Dynamic Random Access Memory (DDRSDRAM), Enhanced Synchronous Dynamic Random Access Memory (ESDRAM), Synchronous Connection Dynamic Random Access Memory (SDRAM) And direct memory bus random access memory (DRRAM). The memory 1302 of the systems and methods described herein is intended to comprise, without being limited to, these and any other suitable types of memory.

In some implementations, the memory 1302 stores elements, executable modules or data structures, or a subset thereof, or their extended set: an operating system 13021 and an application 13022.

The operating system 13021 includes various system programs, such as a framework layer, a core library layer, a driver layer, and the like, for implementing various basic services and processing hardware-based tasks. The application 13022 includes various applications, such as a media player (Media Player), a browser (Browser), etc., for implementing various application services. A program implementing the method of the embodiments of the present disclosure may be included in the application 13022.

In some embodiments of the present disclosure, a program or an instruction stored in the application 13022 may be specifically a program or instruction stored in the application 13022. The processor 1301 is configured to: detect, in a first downlink control channel, physical layer indication information sent by a network side device; determine, according to the physical layer indication information, resource location information of a second downlink control channel carrying control information; and detect the control information in the second downlink control channel according to the resource location information.

The method disclosed in the above embodiments of the present disclosure may be applied to the processor 1301 or implemented by the processor 1301. The processor 1301 may be an integrated circuit chip with signal processing capabilities. In the implementation process, each step of the foregoing method may be completed by an integrated logic circuit of hardware in the processor 1301 or an instruction in a form of software. The processor 1301 may be a general-purpose processor, a digital signal processor (DSP), an application specific integrated circuit (ASIC), a Field Programmable Gate Array (FPGA), or the like. Programmable logic devices, discrete gates or transistor logic devices, discrete hardware components. The methods, steps, and logical block diagrams disclosed in the embodiments of the present disclosure may be implemented or carried out. The general purpose processor may be a microprocessor or the processor or any conventional processor or the like. The steps of the method disclosed in connection with the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 1302, and the processor

1301 reads the information in the memory 1302 and completes the steps of the above method in combination with its hardware.

It will be appreciated that the embodiments described herein can be implemented in hardware, software, firmware, middleware, microcode, or a combination thereof. For hardware implementation, the processing unit can be implemented in one or more Application Specific Integrated Circuits (ASICs), Digital Signal Processing (DSP), Digital Signal Processing Equipment (DSP Device, DSPD), programmable Programmable Logic Device (PLD), Field-Programmable Gate Array (FPGA), general purpose processor, controller, microcontroller, microprocessor, other for performing the functions described herein In an electronic unit or a combination thereof.

For a software implementation, the techniques described herein can be implemented by modules (e.g., procedures, functions, and so on) that perform the functions described herein. The software code can be stored in memory and executed by the processor. The memory can be implemented in the processor or external to the processor.

Specifically, the processor 1301 is further configured to: detect, in the first downlink control channel, the physical layer indication information sent by the network side device of a serving cell of the terminal or a neighboring cell of the serving cell of the terminal.

Specifically, the processor 1301 is further configured to: acquiring a high-layer control signaling sent by the network side device; determine, according to the high-layer control signaling, a transmission period and an offset of the physical layer indication information; determine, according to the transmission period and the offset, a subframe number of the downlink control channel carrying the physical layer indication information; and detect the physical layer indication information sent by the network side device, in the downlink control channel corresponding to the subframe number.

Specifically, the processor 1301 is further configured to: according to a formula idx mod T=offset, determining the subframe number of the downlink control channel carrying the physical layer indication information, where idx is the subframe number of the downlink control channel carrying the physical layer indication information, T is a transmission period of the indication information, and offset is the offset to send the indication information.

Further, the processor 1301 is further configured to: if the physical layer indication information is not detected, feed back a non-response message to the network side device, or determine that the physical layer indication information is not carried in the downlink control channel corresponding to the subframe number.

The resource location information of the second downlink control channel includes at least one of: a downlink subframe number, a frequency domain location, a spatial domain location and a carrier number of the second downlink control channel.

The processor 1301 is further configured to: extract the physical layer indication information to obtain a first index value of the first downlink control channel carrying the control information; determine, according to a preset correspondence between index values and resource locations, the resource location information of the second downlink control channel corresponding to the first index value.

The control information includes the resource location information occupied by a transmission channel carrying service data.

According to the terminal 1300 in some embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal. In addition, since the network side device uses the physical layer indication information to indicate the configuration signaling of the discontinuous transmission originally performed in L2/L3, thereby reducing the detection complexity of the terminal.

Figure 14:
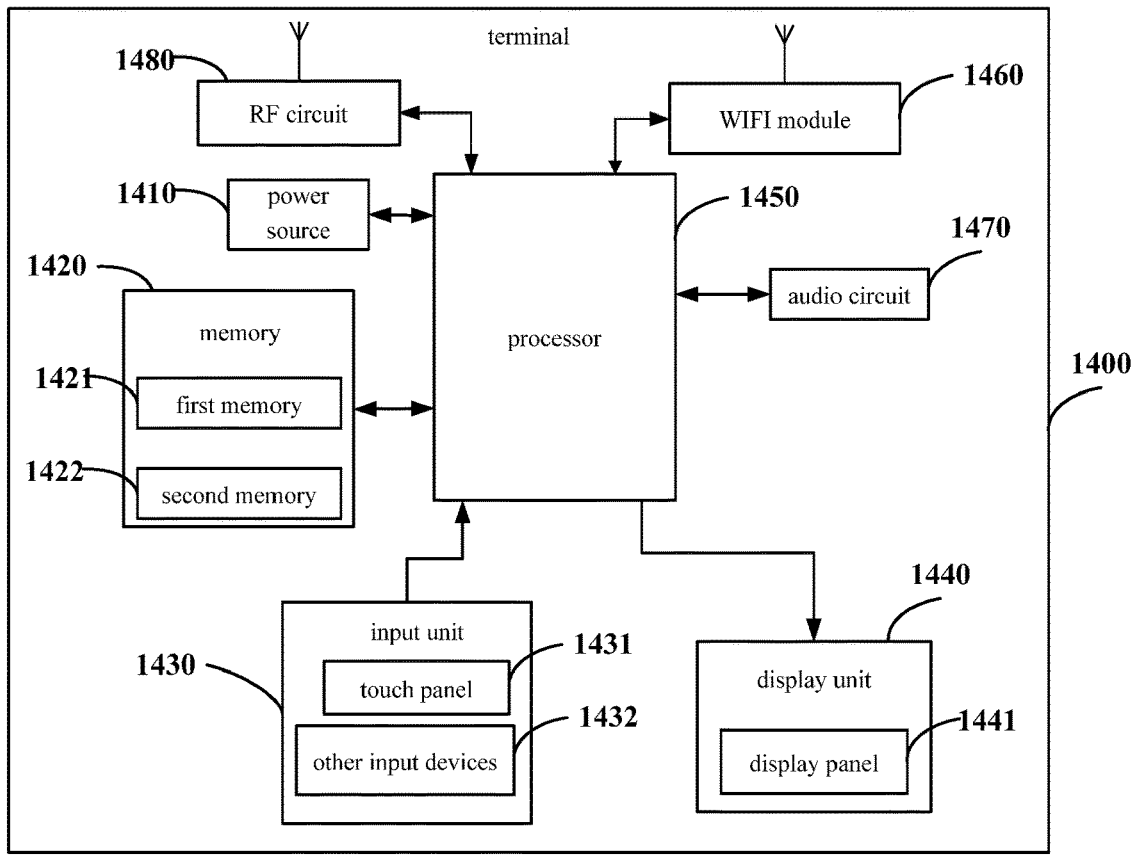
FIG. 14 is a block diagram of a terminal in some embodiments of the present disclosure.

In some embodiments, FIG. 14 is a schematic structural diagram of a terminal according to another embodiment of the present disclosure. Specifically, the terminal 1400 in FIG. 14 may be a mobile phone, a tablet computer, a personal digital assistant (PDA), or a car computer.

The terminal 1400 in FIG. 14 includes a power source 1410, a memory 1420, an input unit 1430, a display unit 1440, a processor 1450, a WIFI (Wireless Fidelity) module 1460, an audio circuit 1470, and an RF circuit 1480.

The input unit 1430 can be configured to receive information input by the user and generate signal input related to user settings and function control of the terminal 1400. Specifically, in the embodiment of the present disclosure, the input unit 1430 may include a touch panel 1431. The touch panel 1431, also referred to as a touch screen, can collect touch operations on or near the user (such as the operation of the user using any suitable object or accessory such as a finger or a stylus on the touch panel 1431), and according to the preset The programmed program drives the corresponding connection device. Optionally, the touch panel 1431 may include two parts: a touch detection device and a touch controller. The touch detection device detects the touch orientation of the user, and detects a signal brought by the touch operation, and transmits the signal to the touch controller; the touch controller receives the touch information from the touch detection device, converts the touch information into contact coordinates, and sends the touch information. The processor 1450 is provided and can receive commands from the processor 1450 and execute them. In addition, the touch panel 1431 can be implemented in various types such as resistive, capacitive, infrared, and surface acoustic waves. In addition to the touch panel 1431, the input unit 1430 may further include other input devices 1432. The other input devices 1432 may include, but are not limited to, a physical keyboard, function keys (such as volume control buttons, switch buttons, etc.), trackballs, mice, joysticks, and the like. One or more of them.

The display unit 1440 can be used to display information input by the user or information provided to the user and various menu interfaces of the terminal. The display unit 1440 can include a display panel 1441. Alternatively, the display panel 1441 can be configured in the form of an LCD or an Organic Light-Emitting Diode (OLED).

It should be noted that the touch panel 1431 may cover the display panel 1441 to form a touch display screen, and when the touch display screen detects a touch operation on or near it, it is transmitted to the processor 1450 to determine the type of the touch event, and then the processor The 1450 provides a corresponding visual output on the touch display depending on the type of touch event.

The touch display includes an application interface display area and a common control display area. The arrangement manner of the application interface display area and the display area of the common control is not limited, and the arrangement manner of the two display areas can be distinguished by up-and-down arrangement, left-right arrangement, and the like. The application interface display area can be used to display the interface of the application. Each interface can contain interface elements such as at least one application's icon and/or widget desktop control. The application interface display area can also be an empty interface that does not contain any content. The common control display area is used to display controls with high usage, such as setting buttons, interface numbers, scroll bars, phone book icons, and the like.

The processor 1450 is a control center of the terminal, and connects various parts of the entire mobile phone through various interfaces and lines, by running or executing software programs and/or modules stored in the first memory 1421, and calling and storing in the second memory 1422. The internal data, performing various functions of the terminal and processing data, thereby performing overall monitoring of the terminal. Optionally, the processor 1460 can include one or more processing units.

In the embodiment of the present disclosure, the physicality sent by the network side device is detected in the first downlink control channel by calling a software program and/or module stored in the first memory 1421 and/or data in the second memory 1422. The layer indication information is determined, according to the physical layer indication information, the resource location information of the second downlink control channel carrying the control information, and the control information is detected in the second downlink control channel according to the resource location information.

Specifically, the processor 1450 is further configured to: detect, in the first downlink control channel, the physical layer indication information sent by the network side device of a serving cell of the terminal or a neighboring cell of the serving cell of the terminal.

Specifically, the processor 1450 is further configured to: acquire a high-layer control signaling sent by the network side device; determine, according to the high-layer control signaling, a transmission period and an offset of the physical layer indication information; determine, according to the transmission period and the offset, a subframe number of the downlink control channel carrying the physical layer indication information; and detect the physical layer indication information sent by the network side device, in the downlink control channel corresponding to the subframe number.

Specifically, the processor 1450 is further configured to: according to a formula idx mod T=offset, determine the subframe number of the downlink control channel carrying the physical layer indication information, where idx is the subframe number of the downlink control channel carrying the physical layer indication information, T is a transmission period of the indication information, and offset is the offset to send the indication information.

Further, the processor 1450 is further configured to: if the physical layer indication information is not detected, feed back a non-response message to the network side device, or determine that the physical layer indication information is not carried in the downlink control channel corresponding to the subframe number.

The resource location information of the second downlink control channel includes at least one of: a downlink subframe number, a frequency domain location, a spatial domain location and a carrier number of the second downlink control channel.

The processor 1450 is further configured to: extract the physical layer indication information to obtain a first index value of the first downlink control channel carrying the control information; determine, according to a preset correspondence between index values and resource locations, the resource location information of the second downlink control channel corresponding to the first index value.

The control information includes the resource location information occupied by a transmission channel carrying service data.

According to the terminal 1400 in some embodiments of the present disclosure, the terminal obtains the indication information sent by the network side device by detecting the first downlink control channel, and then determines, by parsing the indication information, the resource location information of the second downlink control channel carrying the downlink control information, and detects the downlink control information only in the second downlink control channel indicated in the indication information, thereby reducing the times of detecting the terminal and reducing the power consumption of the terminal. In addition, since the network side device uses the physical layer indication information to indicate the configuration signaling of the discontinuous transmission originally performed in L2/L3, thereby reducing the detection complexity of the terminal.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, and details are not described herein again.

In the embodiments provided by the present application, it should be understood that the disclosed apparatus and method may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in various embodiments of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, a portion of the technical solution of the present disclosure that contributes in essence or to the related art or a part of the technical solution may be embodied in the form of a software product stored in a storage medium, including several The instructions are for causing a computer device (which may be a personal computer, server, or network device, etc.) to perform all or part of the steps of the methods described in various embodiments of the present disclosure. The foregoing storage medium includes various media that can store program codes, such as a USB flash drive, a mobile hard disk, a ROM, a RAM, a magnetic disk, or an optical disk.

Figure 15:
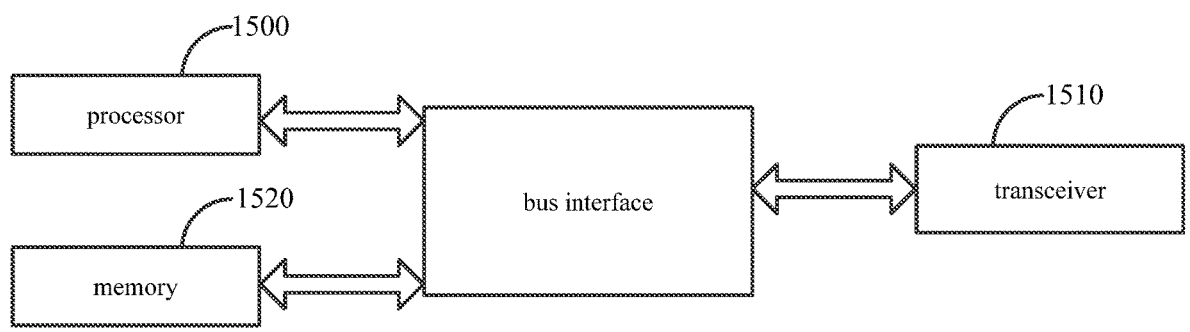
FIG. 15 is a block diagram of a network side device in some embodiments of the present disclosure.

In some embodiments, in order to better achieve the above object, as shown in FIG. 15, the seventh embodiment of the present disclosure further provides a network side device, where the network side device includes: a processor 1500; a memory 1520 having a bus interface coupled to the processor 1500, and a transceiver 1510 coupled to the processor 1500 via a bus interface; the memory 1520 for storing programs and data used by the processor in performing operations transmitting data information or pilots through the transceiver 1510, and receiving an uplink control channel through the transceiver 210; the processor 1500 calls and executes the programs and data stored in the memory 1520, to: send, through a first downlink control channel, physical layer indication information to a terminal, to indicate resource location information of the second downlink control channel carrying control information to the terminal; send the control information through the second downlink control channel corresponding to the physical layer indication information.

The processor 1500 is configured to read the program in the memory 1520, and perform the following process: sending, through a first downlink control channel, physical layer indication information to a terminal, to indicate resource location information of the second downlink control channel carrying control information to the terminal; sending the control information through the second downlink control channel corresponding to the physical layer indication information.

The transceiver 1510 is configured to receive and transmit data under the control of the processor 1500.

Here, in FIG. 15, the bus architecture may include any number of interconnected buses and bridges, specifically linked by one or more processors represented by processor 1500 and various circuits of memory represented by memory 1520. The bus architecture can also link various other circuits such as peripherals, voltage regulators, and power management circuits, which are well known in the art and, therefore, will not be further described herein. The bus interface provides an interface. The transceiver 1510 can be a plurality of components, including a transmitter and a transceiver, providing means for communicating with various other devices on a transmission medium. The processor 1500 is responsible for managing the bus architecture and general processing, and the memory 1520 can store data used by the processor 1500 in performing operations.

In this way, according to the network side device in some embodiments of the present disclosure, the network side device sends a physical layer indication information to the terminal to inform the terminal of the resource location information of the second downlink control channel carrying the downlink control information, so that the terminal only detects the downlink control channel carrying the control information, instead of detecting all downlink control channels, thereby reducing the times of detecting of the terminal and reducing the power consumption of the terminal. In addition, the network side device uses the physical layer signaling to indicate, thereby reducing the detection complexity of the terminal to the downlink control channel. In addition, the network side device may further determine the scheduling quantity of the second downlink control channels according to the transmission condition of the TCP data packet, so as to solve the slow start problem of the TCP service.

In addition, it should be noted that in the apparatus and method of the present disclosure, it is apparent that various components or steps may be decomposed and/or recombined. These decompositions and/or recombinations should be considered as equivalents to the present disclosure. Also, the steps of performing the above-described series of processes may naturally be performed in chronological order in the order illustrated, but need not necessarily be performed in chronological order, and some steps may be performed in parallel or independently of each other. It will be appreciated by those skilled in the art that all or any of the steps or components of the methods and apparatus of the present disclosure may be in a network of any computing device (including a processor, storage medium, etc.) or computing device, in hardware, firmware The software, or a combination thereof, is implemented by those of ordinary skill in the art using their basic programming skills while reading the description of the present disclosure.

Thus, the objects of the present disclosure can also be achieved by running a program or a set of programs on any computing device. The computing device can be a well-known general purpose device. Accordingly, the objects of the present disclosure may also be realized by merely providing a program product including program code for implementing the method or apparatus. That is to say, such a program product also constitutes the present disclosure, and a storage medium storing such a program product also constitutes the present disclosure. It will be apparent that the storage medium may be any known storage medium or any storage medium developed in the future. It should also be noted that in the apparatus and method of the present disclosure, it is apparent that various components or steps may be decomposed and/or recombined. These decompositions and/or recombination should be considered as equivalents to the present disclosure. Also, the steps of performing the series of processes described above may naturally be performed in chronological order in the order illustrated, but need not necessarily be performed in chronological order. Certain steps may be performed in parallel or independently of one another.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A method for detecting a downlink control channel, applied to a terminal and comprising:
   detecting, in a first downlink control channel, physical layer indication information sent by a network side device;
   determining, according to the physical layer indication information, resource location information of a second downlink control channel carrying control information; and detecting the control information in the second downlink control channel according to the resource location information;

wherein the detecting, in the first downlink control channel, the physical layer indication information sent by the network side device comprises:

acquiring a high-layer control signaling sent by the network side device;

determining, according to the high-layer control signaling, a transmission period and an offset of the physical layer indication information;

determining, according to the transmission period and the offset, a subframe number of the downlink control channel carrying the physical layer indication information; and detecting the physical layer indication information sent by the network side device, in the downlink control channel corresponding to the subframe number;

wherein the determining, according to the transmission period and the offset, the subframe number of the downlink control channel carrying the physical layer indication information comprises:

according to a formula idx mod T=offset, determining the subframe number of the downlink control channel carrying the physical layer indication information, wherein idx is the subframe number of the downlink control channel carrying the physical layer indication information, T is a transmission period of the indication information, and offset is the offset to send the indication information.

2. The method according to claim 1, wherein the detecting, in the first downlink control channel, the physical layer indication information sent by the network side device comprises:

detecting, in the first downlink control channel, the physical layer indication information sent by the network side device of a serving cell of the terminal or a neighboring cell of the serving cell of the terminal.

3. The method according to claim 1, wherein subsequent to the detecting the physical layer indication information sent by the network side device in the downlink control channel corresponding to the subframe number, the method further comprises:

when the physical layer indication information is not detected, feeding back a non-response message to the network side device, or determining that the physical layer indication information is not carried in the downlink control channel corresponding to the subframe number.

4. The method according to claim 1, wherein the resource location information of the second downlink control channel comprises at least one of: a downlink subframe number, a frequency domain location, a spatial domain location and a carrier number of the second downlink control channel.

5. The method according to claim 1, wherein the determining, according to the physical layer indication information, the resource location information of the second downlink control channel carrying the control information comprises:

extracting the physical layer indication information to obtain a first index value of the first downlink control channel carrying the control information;

determining, according to a preset correspondence between index values and resource locations, the resource location information of the second downlink control channel corresponding to the first index value.

6. The method according to claim 1, wherein the control information comprises the resource location information occupied by a transmission channel carrying service data.

7. A method for indicating a downlink control channel, applied to a network side device and comprising:

sending, through a first downlink control channel, physical layer indication information to a terminal, to indicate resource location information of the second downlink control channel carrying control information to the terminal;

sending the control information through the second downlink control channel corresponding to the physical layer indication information;

wherein the sending, through the first downlink control channel, the physical layer indication information to the terminal comprises:

sending a high-layer control signaling to the terminal, to indicate a transmission period and an offset of the physical layer indication information to the terminal; and sending the physical layer indication information to the terminal, through a control channel corresponding to a subframe number meeting a relationship between the transmission period and the offset;

wherein the subframe number is determined according to a formula idx mod T=offset, idx is the subframe number of the downlink control channel carrying the physical layer indication information, T is a transmission period of the indication information, and offset is the offset to send the indication information.

8. The method according to claim 7, wherein prior to the sending, through the first downlink control channel, the physical layer indication information to the terminal, the method further includes:

when a Transmission Control Protocol (TCP) data packet is sent or arrived, determining, according to a transmission condition of the TCP data packet, a quantity of the second downlink control channels carrying the control information;

determining the physical layer indication information sent to the terminal, according to the quantity of the second downlink control channels.

9. A network side device, comprising: a memory, a processor and a computer program stored in the memory and operable on the processor, wherein the processor executes the computer program to perform the method for indicating a downlink control channel according to claim 7.

10. The network side device according to claim 9, wherein the processor executes the computer program to:

when a Transmission Control Protocol (TCP) data packet is sent or arrived, determine, according to a transmission condition of the TCP data packet, a quantity of the second downlink control channels carrying the control information;

determine the physical layer indication information sent to the terminal, according to the quantity of the second downlink control channels.

11. A terminal, comprising: a memory, a processor and a computer program stored in the memory and operable on the processor, wherein the processor executes the computer program to:

detect, in a first downlink control channel, physical layer indication information sent by a network side device;

determine, according to the physical layer indication information, resource location information of a second downlink control channel carrying control information; and detect the control information in the second downlink control channel according to the resource location information;

wherein the processor executes the computer program to:

acquire a high-layer control signaling sent by the network side device;

determine, according to the high-layer control signaling, a transmission period and an offset of the physical layer indication information;

determine, according to the transmission period and the offset, a subframe number of the downlink control channel carrying the physical layer indication information; and detect the physical layer indication information sent by the network side device, in the downlink control channel corresponding to the subframe number;

wherein the processor executes the computer program to:

according to a formula idx mod T=offset, determine the subframe number of the downlink control channel carrying the physical layer indication information, wherein idx is the subframe number of the downlink control channel carrying the physical layer indication information, T is a transmission period of the indication information, and offset is the offset to send the indication information.

12. The terminal according to claim 11, wherein the processor executes the computer program to detect, in the first downlink control channel, the physical layer indication information sent by the network side device of a serving cell of the terminal or a neighboring cell of the serving cell of the terminal.

13. The terminal according to claim 11, wherein the resource location information of the second downlink control channel comprises at least one of: a downlink subframe number, a frequency domain location, a spatial domain location and a carrier number of the second downlink control channel.

14. The terminal according to claim 11, wherein the processor executes the computer program to:

extract the physical layer indication information to obtain a first index value of the first downlink control channel carrying the control information;

determine, according to a preset correspondence between index values and resource locations, the resource location information of the second downlink control channel corresponding to the first index value.

15. The terminal according to claim 11, wherein the control information comprises the resource location information occupied by a transmission channel carrying service data.

\* \* \* \* \*